US005578333A

United States Patent [19]
Schad et al.

[11] Patent Number: 5,578,333
[45] Date of Patent: Nov. 26, 1996

[54] COMBINED MOLD CARRIER AND LINKAGE APPARATUS

[75] Inventors: Robert D. Schad, Toronto; John Di Simone, Woodbridge, both of Canada

[73] Assignee: Husky Injection Molding Systems Ltd., Canada

[21] Appl. No.: 255,004

[22] Filed: Jun. 7, 1994

Related U.S. Application Data

[63] Continuation of Ser. No. 231,661, Apr. 25, 1994, abandoned.

[51] Int. Cl.⁶ ............................................ B29C 45/64
[52] U.S. Cl. .................... 425/588; 425/338; 425/451.3; 425/589; 425/592
[58] Field of Search .................... 425/589, 588, 425/592, 595, 450.1, 451.3, 451.5, 451.9, 338, 190

[56] References Cited

U.S. PATENT DOCUMENTS

| | | | |
|---|---|---|---|
| 2,586,474 | 2/1952 | Moore | 425/338 |
| 2,966,183 | 12/1960 | Werner | 425/338 |
| 3,209,405 | 10/1965 | Loewenfeld | 425/338 |
| 3,518,724 | 7/1970 | Book | 425/338 |
| 3,659,997 | 5/1972 | Rees | 425/575 |
| 3,767,352 | 10/1973 | Rees | 425/441 |
| 3,868,204 | 2/1975 | Bongers | 425/451.5 |
| 3,941,548 | 3/1976 | Bruder | 425/450.1 |
| 4,207,051 | 6/1980 | Wright et al. | 425/556 |
| 4,408,981 | 10/1983 | Brown | 425/589 |
| 4,718,845 | 1/1988 | Sheffield et al. | 425/589 |
| 4,929,166 | 5/1990 | DiSimone et al. | 425/190 |
| 5,104,308 | 4/1992 | Morton et al. | 425/592 |

OTHER PUBLICATIONS

Communique, vol. 7, No. 1, dated Feb., 1991 (1 page) (Editor of publication–Karen Wolfe), published by Canadian Plastics Institute.

Primary Examiner—James P. Mackey
Attorney, Agent, or Firm—Bachman & LaPointe, P.C.

[57] ABSTRACT

An injection molding machine having a plurality of axially arranged mold stations including structure for supporting sets of mold plates and a mechanism for opening, closing and overstroking mold plates.

6 Claims, 6 Drawing Sheets

COMBINED MOLD CARRIER AND LINKAGE APPARATUS

CROSS REFERENCE TO RELATED APPLICATION

This application is a Continuation of Application Ser. No. 08/231,661, filed Apr. 25, 1994, now abandoned.

BACKGROUND OF THE INVENTION

The present invention relates to injection molding machines and relates, in particular, to machines having a plurality of axially arranged mold stations each station having cooperating mold plates defining mold cavities in well known fashion. This mold arrangement is known in the art as a stack mold.

In prior art machines a plurality of sets of mold plates, one set of mold plates for each mold station, are operated, open and closed, by a variety of mechanisms many of which are complicated and obstruct access for servicing molds at the various mold stations. Typical prior art mold operating mechanisms are shown in FIG. 2 of U.S. Pat. No. 3,659,997 and FIG. 1 of U.S. Pat. No. 4,207,051.

In prior art arrangements there are numerous problems relating to alignment, support and precise movement of mold plates in order to achieve the highest quality molded product with minimum wear and tear of the mechanisms utilized to open and close the mold cavity at the various mold stations.

One other problem is the lack of adequate access in the open mold condition to service the molds and mold plates and to replace molds without having to dismantle the molding machine.

That is, many prior art units support the mold plates on the machine tie rods which involves a cumbersome, time consuming, laborious task when one wishes to replace molds. Such a step frequently involves removal of tie rods.

Furthermore, it is desirable to provide a mold actuating mechanism that moves the various sets of mold plates from the open and closed positions so that all mold stations open and close simultaneously and precisely during the course of a continuous molding cycle.

In addition it is desirable to provide a mechanism that one can "overstroke" readily to increase access to service and replace molds and/or mold plates without major disassembly of the molding machine.

The term overstroke is intended to mean intentional opening of the various mold stations a distance beyond the normal open stroke distance of the normal cycle of operation.

A set of mold plates in the disclosed embodiment of the present invention includes mold plates, per se, and support plates to which the mold plates are attached, sometimes referred to collectively as a "set of plates".

OBJECTS OF THE INVENTION

A principal feature of the present invention is the provision of a novel means for supporting a stack mold having a plurality of molding stations.

A further important feature of the invention is the provision of a simple, durable mechanism for opening and closing all molds at a plurality of molding stations simultaneously, precisely and with uniform stroke.

A further feature is the provision of mold support means and mold actuating means which facilitates rapid, and convenient installation and removal of elements of multilevel molds (a plurality of axially arranged molding stations, i.e. stack mold) with minimum dismantling of molding machine.

A still further feature of the invention is the provision of a novel method of opening and closing a plurality of axially arranged mold stations simultaneously and precisely.

SUMMARY OF THE INVENTION

The present embodiment of the invention includes a basic machine frame including the classic tie bars which extend, in upper and lower pairs, from a fixed platen at one end to the machine frame at the opposite end of the tie bars.

A movable platen reciprocates along the upper and lower pairs of tie bars.

A central set of mold plates are received in a support member which, in turn, is supported by and is movable along the upper and lower tiers of tie bars.

The central set of mold plates are readily removable in that they may be lifted vertically free of the support member. Correspondingly new or replacement central plates are installed by merely lowering the plates until they bottom on the support member.

A primary crank mechanism is pivotally connected to the central set of mold plates via the support member and is linked pivotally at opposed ends to the movable platen and to the fixed platen. The connection to the platens is accomplished by pivotally mounted links.

The primary crank mechanism straddles the injection molding machine and exists in the form of a pair of primary cranks which are spaced outwardly of the tie bars. To and fro motion of the movable platen actuates the primary crank mechanism maintaining the central mold plates equidistant from the fixed and movable platens as the molding machine cycles from open to closed positions.

A secondary crank mechanism, comprising in the disclosed embodiment, opposed pairs of smaller cranks supported pivotally and individually by sets of mold plates which are positioned on opposite sides of the central set. One end of the secondary cranks are linked pivotally to opposite sides of the central plates and the opposite end of a first pair of secondary cranks are linked pivotally to the movable platen while the opposite end of a second pair of secondary cranks are linked pivotally to the fixed platen.

The secondary cranks are disposed inwardly of the machine tie bars in opposed pairs. Thus motion of the movable platen drives the primary cranks and in so doing drives the secondary cranks so that the primary and secondary cranks provide the motion to open and close the mold stations in a precise and simultaneous manner which will be more apparent as this specification proceeds.

While the disclosed embodiment of the invention discloses one pair of primary cranks and two pairs of secondary cranks operating and providing motion for four (4) mold stations it is entirely within the spirit and scope of the invention that the described crank arrangement be duplicated axially to operate many axially arranged mold stations. Sets of mold plates (second and third sets) on opposite sides of the central set of mold plates (first set) are supported by pairs of laterally spaced pins projecting from the mold plates which are fastened to the movable and fixed platens, respectively. The pairs of pins are offset vertically so as to avoid interference as the mold stations open and close. The pins are received in sleeve bearings or bushings formed in the upper ends of the second and third sets of mold plates.

In normal mold open and close positions the pins are also received in sleeve bearing formed in the central set of mold plates which provides support for the terminal ends of the pins.

When the mold stations are overstroked i.e., moved to a mold open position beyond the normal open position to provide operator increased access for servicing the molds, the support pins withdraw from the bushings of the central set of mold plates. To compensate for the loss of support for the free or terminal ends of the pins and loss of support for the second and third sets of mold plates, auxiliary support means are provided in the form of "outriggers" extending from the second and third sets of mold plates.

The outriggers are bearing means or shoes which bear upon and move along the upper pair of tie rods thus augmenting pin support in the overstroked condition.

Other features and advantages of the present invention will become more apparent from an examination of succeeding specification when read in conjunction with the appended drawings; in which:

DETAILED DESCRIPTION OF THE PREFERRED EMBODIMENTS AND METHODS

Referring in detail to the drawings, in particular FIGS. 1, 2 4, and 6, the reference numeral 11 indicates, generally, a portion of an injection molding machine comprising a plurality of mold stations A, B, C and D, all in the open mold position, disposed between a fixed platen 12 and a movable platen 13 with a pair of upper tie bars 14 and 16 and a pair of lower tie bars 17 and 18.

Figure 1:
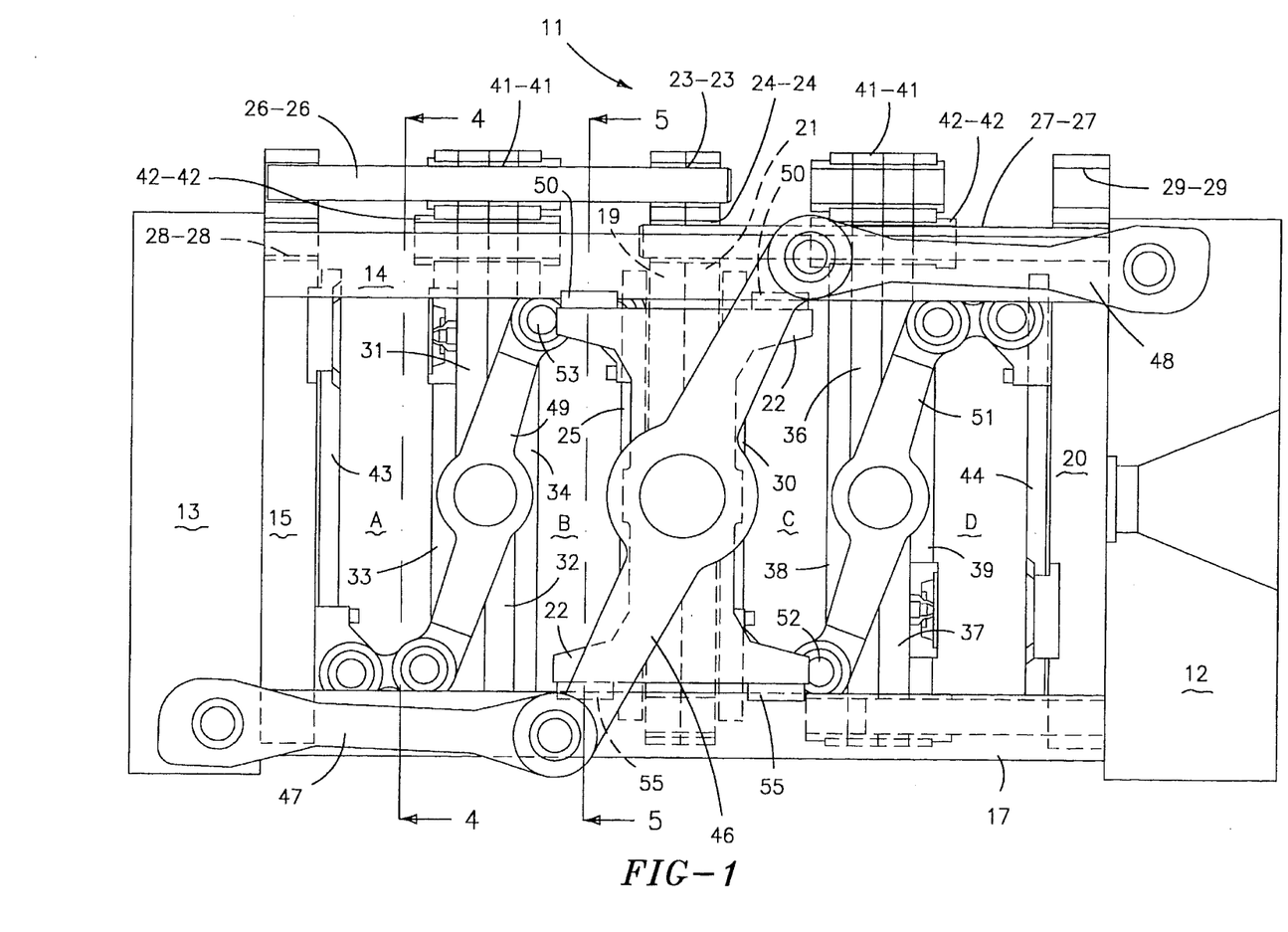
FIG. 1 is a side view of a portion of an injection molding machine showing a multi-level mold (axially arranged mold stations) in the open mold position.

Mold stations A and B are supplied with moldable material via supply conduit S and mold stations C and D are supplied via conduit S'.

The tie bars are secured at one end to fixed platen 12 and at the opposite end to a machine frame member, not shown.

In classical fashion the movable platen 13 is supported by and is moved, to and fro, along the tie bars to open and close the mold stations by conventional drive means such as a hydraulic ram, not shown.

A central set of mold support plates 19 and 21 carrying mold plates 25 and 30 are received in and supported by support member 22 in turn, carried movably by the lower pair of tie bars 17 and 18 and stabilized by engagement with an upper pair of the bars 14 and 16. The plates 19 and 21 and all associated mold plates comprising mold stations A–D are removable as an assembly by lifting the assembly vertically free of the support member 22.

Note that the support member 22 includes a pair of shoes or bearings 50 which engage and ride along upper tie bars 14 and 16 and a pair of shoes 55 which engage and ride along the lower tie bars 17 and 18 thereby guiding and stabilizing support member 22.

As is most apparent in FIG. 1 the upper end of the plates 19 and 21 are formed with primary and secondary sleeve bearings or bushings 23 and 24 operable to receive ends of guide or support pins 26 and 27 respectively. That is, a pair of pins 26—26 are received in a pair of primary bushings 23—23 and a pair of pins 27—27 are received in the secondary bushings 24—24. Reference numerals are hyphenated in the drawings to indicate pairs. Opposite ends of the pairs of pins 26—26 and 27—27 are fastened to the movable platen 13 and the fixed platen 12 by means of plates 15 and 20, respectively.

Figure 2:
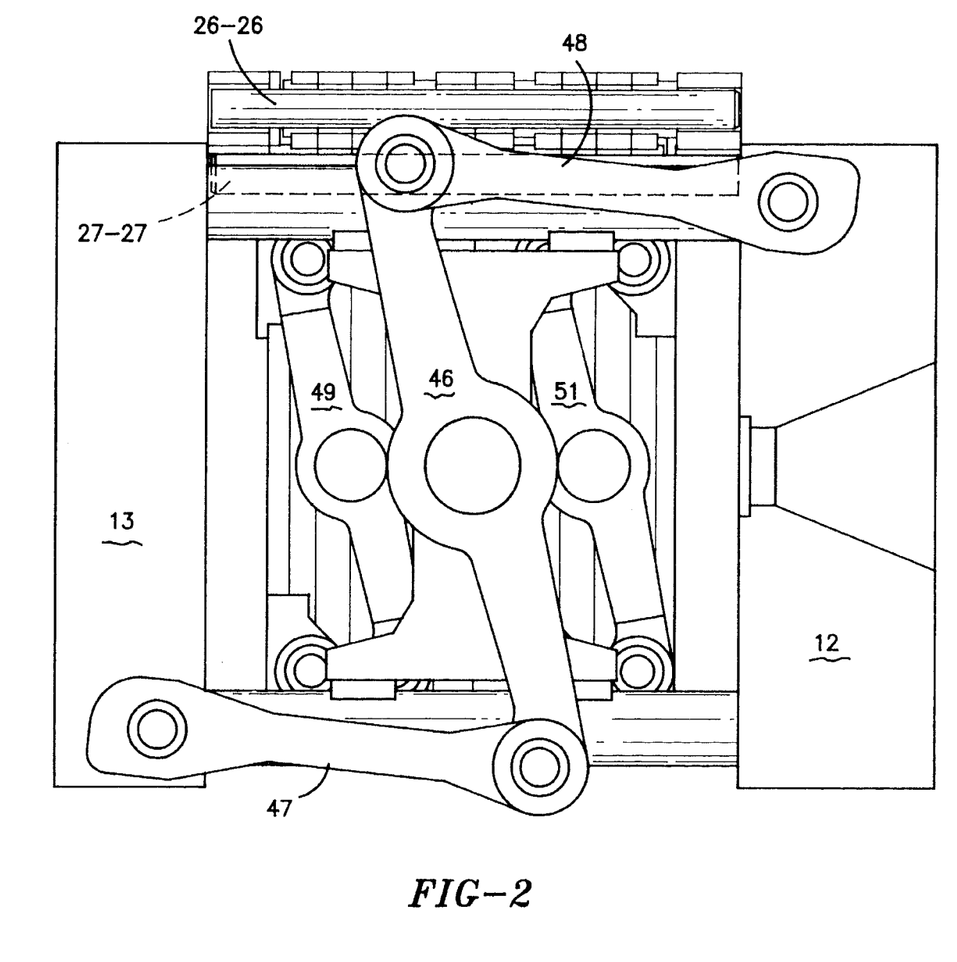
FIG. 2 is a view similar to the showing of FIG. 1 illustrating the closed mold position.

The reference numerals 28 and 29 denote pairs of clearance holes for the guide pins when the mold stations reach the closed position as is most apparent in FIG. 2.

A second set of plates 31 and 32, supporting mold plates 33 and 34, and a third set of plates 36 and 37 supporting mold plates 38 and 39 are also formed with pairs of primary and pairs of secondary bushings 41—41 and 42—42 respectively.

That is, the primary bushings 41—41 of the second set of plates 31 and 32 receive pins 26—26 to support the second set of plates while the pair of secondary bushings 42—42 provide additional support for the pair of pins 27—27 when the molds are in the closed position.

Correspondingly the third set of plates 36 and 37 are supported by the engagement of the pair of pins 27—27 in the secondary bushings 42—42 while the primary bushing 41—41 of this set of plates provide additional support for the pins 26—26 as the mold stations close.

The reference numeral 43 denotes the mold plate which cooperates with mold plate 33 while the reference numeral 44 denotes the mold plate which cooperates with mold plate 39.

A pair of primary cranks 46 (only one shown in FIG. 1) are mounted pivotally to the plate support member 22 on opposed sides of the member 22. Ends of the crank 46 are connected pivotally by means of pivot links 47 and 48 to movable platen 13 and fixed platen 12, respectively.

Each of the second and third sets of plates (31 and 32 and 36 and 37) support pivotally pairs of secondary cranks 49 and 51 (only one crank of each pair shown in FIG. 1).

One end of the secondary cranks are connected by pivot links 52 and 53 to central plates 19 and 21 and at their opposite ends are connected to plates 15 and 20 respectively.

Figure 3:
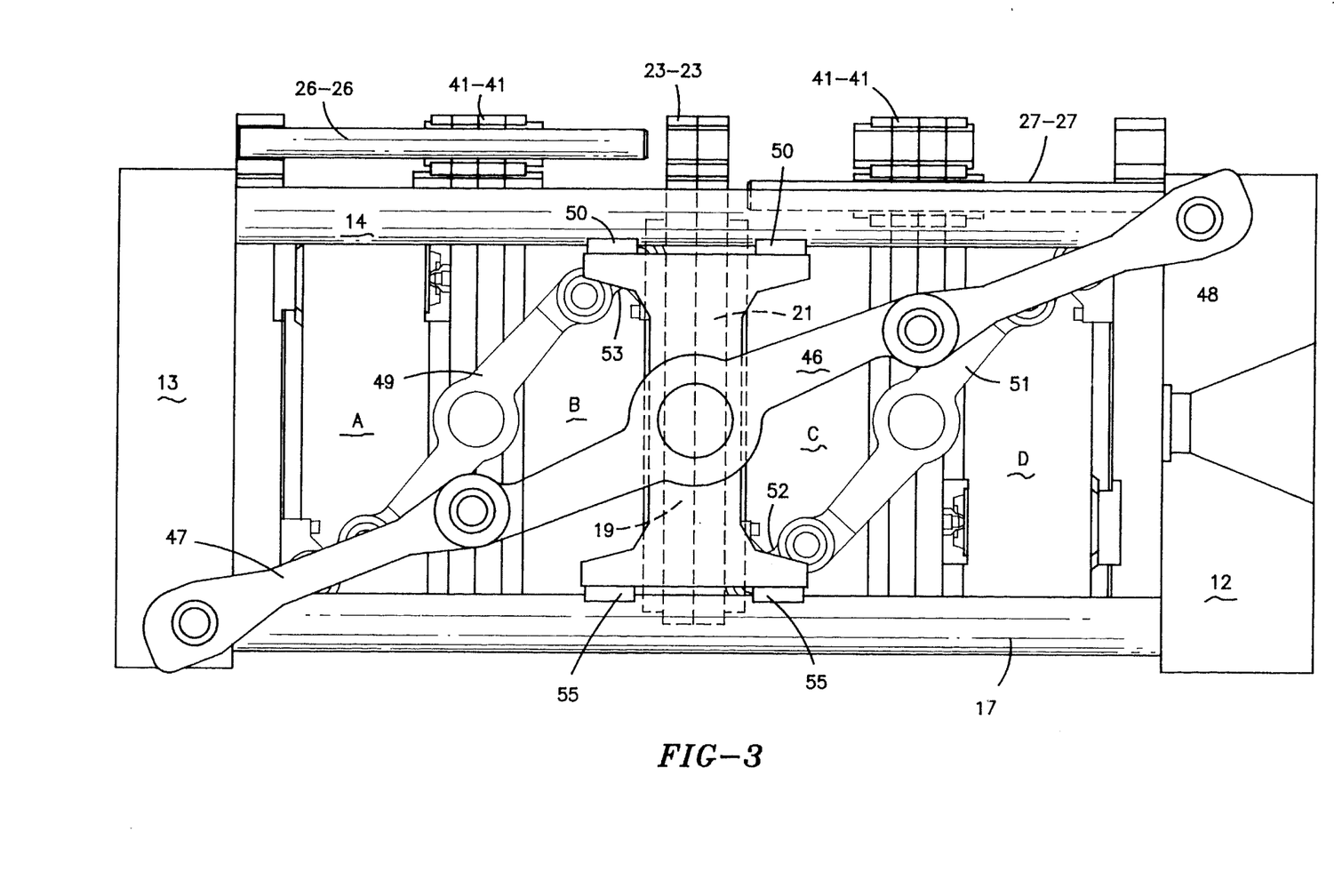
FIG. 3 is a schematic illustration of the overstroked position.
Figure 4:
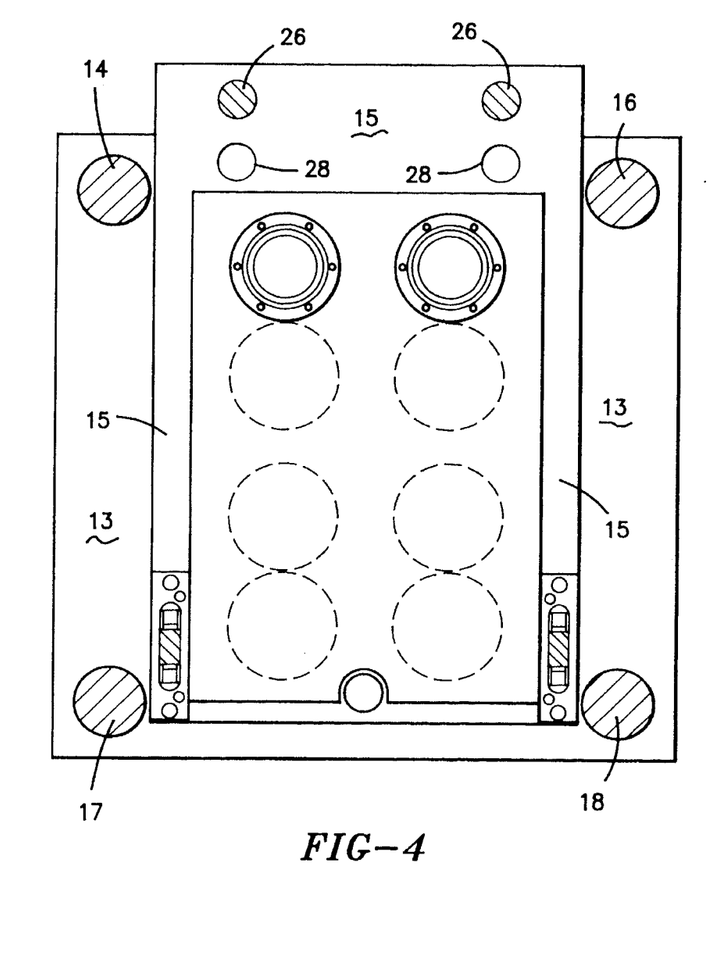
FIG. 4 is a vertical section of FIG. 1 in the plane of the line 4–4 as viewed in the direction of the arrows showing a mold face with the primary crank means removed.
Figure 5:
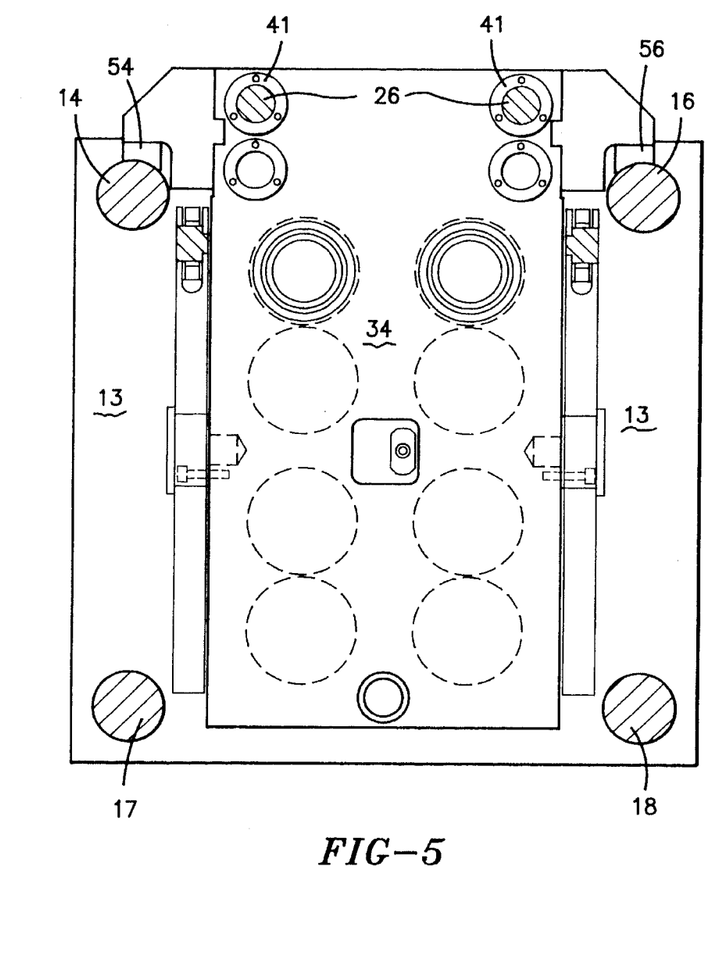
FIG. 5 is a vertical section of FIG. 1 in the plane of the line 5–5 as viewed in the direction of the arrows with the primary crank means removed.
Figure 6:
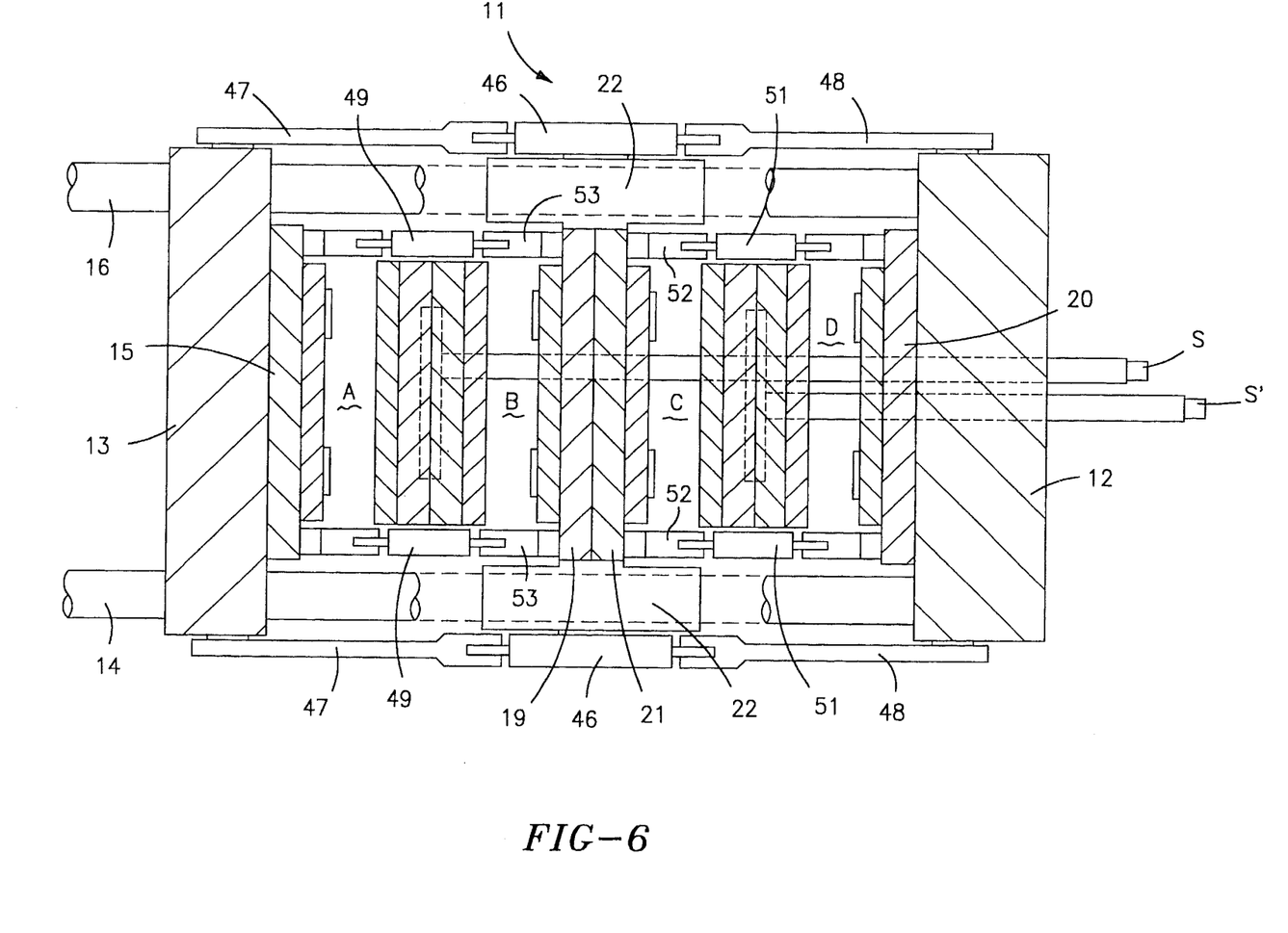
FIG. 6 is a top plan view of the various sets of mold plates showing, schematically, the mold stations in the open mold condition as well as the disposition of the primary and secondary crank means. Guide pins for the several sets of mold plates are not shown for purposes of clarity.

FIG. 3 shows the mold stations in the overstroked condition providing wide spacing between mold plates to facilitate servicing. Note that in the FIG. 3 position of the mold stations the pins 26—26 and 27—27 have withdrawn from central plates 19 and 21 leaving the ends of the pins without the support normally provided by central plates. In order to compensate for this loss of support in the overstroked condition the second and third sets of mold plates are provided with outriggers or auxiliary bearings 54 and 56 as best seen in FIG. 5. These bearings bear upon and move along the upper tier of tie bars 14 and 16.

While these bearings are operative during the normal open and close cycling of the various mold stations their utility is especially important when the molds are overstroked.

Note further that during the course of normal operation of the mold stations including overstroking the primary and secondary cranks and their connecting links operate with precision opening and closing all molds simultaneously and the central mold set remains equidistant from the movable and stationary plates at all times.

Figure 7:
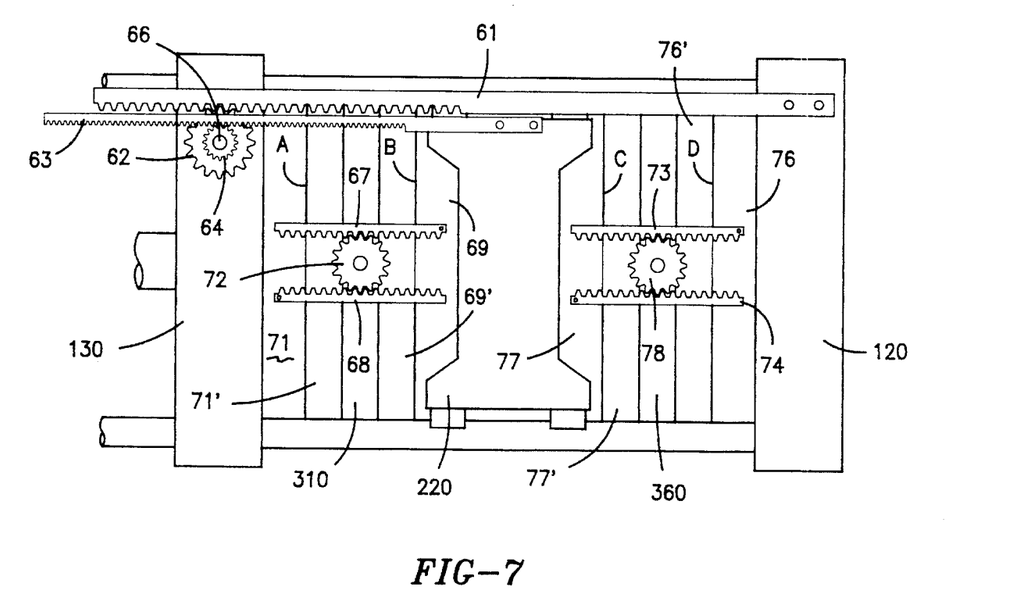
FIG. 7 shows, schematically, an alternative mechanism for opening and closing molds; the mold stations A, B, C and D are shown in the closed condition.

Referring to FIG. 7, an alternative mechanism for opening and closing the mold plates is shown schematically wherein fixed platen 120 and movable platen 130 straddle mold stations A, B, C and D, illustrated in the closed condition.

A rack 61 (first rack) is fastened at one end to fixed platen 120 and the opposite end is supported and engaged by pinion 62 (first pinion) carried by movable platen 130.

A primary rack 63 (second rack) is fastened at one end to a set of central mold plates (first set) via plate support member 220 and the opposite end is supported and engaged by pinion 64 (second pinion).

Pinions 62 and 64 are keyed together so that they rotate in unison upon shaft 66 secured to movable platen 130.

Secondary racks 67 and 68, at mold stations A and B, are fastened to mold plates 69 and 71, respectively, and engage pinion 72.

Secondary racks 73 and 74 at mold stations C and D are fastened to mold plates 76 and 77, respectively and engage pinion 78. Pinions 72 and 78, mounted on mold plates 310 and 360, respectively are identical and operate in conjunction with their respective racks to open and close mold stations A, B, C and D in precise and simultaneous fashion during the molding cycle. That is, the opening and closing strokes of the molds at stations A, B, C, and D are identical and occur simultaneously.

Figure 8:
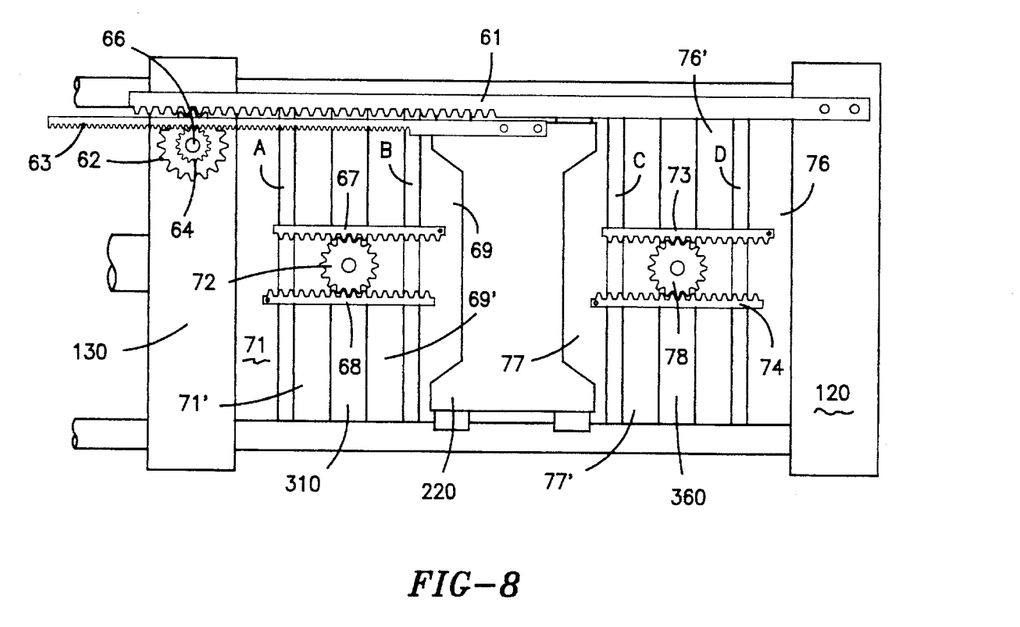
FIG. 8 is similar to FIG. 7 showing the mold stations in the open condition.

The relative mechanical advantage among the pinions 62,64 and identical pinions 72 and 78 is such that upon moving the movable platen 130 in an opening stroke (by well known means) to open all mold stations, platen 130 moves a distance x, central mold plates in members 220 move a distance x/2 and the mold plates 310 move a distance 3x/4, and mold plates and 360 move a distance x/4 (all in the same direction) so that all mold stations open precisely and with a uniform opening dimension.

It is to be understood that mold plates 69 and 77 are mounted upon opposed sides of member 220, plate 71 is mounted upon movable platen 130 and plate 76 is mounted upon fixed platen 120. Mold plates 69' and 71' are mounted upon opposed sides of plate 310 while mold plates 76' and 77' are mounted upon opposed sides of plate 360.

The differential movement described above is achieved by selecting the diameter and therefore the peripheral measurement of the several pinions so as to generate the desired linear motion of member 220.

Motion of the member 220 operates to open mold stations C and D in response to the action of racks 73 and 74 cooperating pinion 78.

It is anticipated that numerous variations and modifications may be derived without departing from the spirit and scope of the invention. For example, a variety of mechanisms may be devised to provide the motion for opening and closing the mold stations in precise fashion.

What is claimed is:

1. In an injection molding machine including fixed pairs of upper and lower tie bars, a first fixed platen from which said tie bars extend and a second platen movable along said tie bars, a mold arrangement comprising a plurality of sets of movable plates defining a plurality of mold cavities between cooperating sets of plates wherein said sets of plates are disposed axially to define a plurality of axially arranged mold stations operable to open and close simultaneously during cyclic molding machine operation, the improvement comprising:

a first set of plates, primary motion means connected to said first set of plates, said primary motion means being further connected to said fixed and movable platens, respectively, a second set of plates, a first secondary motion means connected to said second set of plates, said secondary motion means being further connected to said movable platen and to said first set of plates, respectively, whereby motion of said movable platen is operable to activate said primary motion means relative to said first set of plates to move said first set of plates along said tie bars while maintaining said first set of plates equidistant from said platens, motion of said first set of plates in combination with motion of said movable platen being operable to drive said secondary motion means effective to move said second set of plates along said tie bars so that the combined action of both motion means is operable to open and close at least two mold stations simultaneously, wherein the primary motion means comprises:

rack means and cooperating pinion means, a support member for supporting said first set of plates, a first portion of the rack means being secured to the fixed platen, a second portion of the rack means being secured to said support member, said pinion means defining a plurality of pinions fixed to said movable platen, and each rack portion having a cooperating pinion individual thereto whereby motion of the movable platen is effective to move said first set of plates via motion of said support member.

2. The improvement of claim 1 wherein the pinion means are keyed to a common shaft, a first pinion cooperating with said first portion of said rack means, a second pinion cooperating with said second portion of said rack means, the mechanical advantage of the first and second pinions being such that motion of the movable platen through a linear distance x moves the support member and the first set of plates through a linear distance x/2.

3. The improvement of claim 2, wherein said first secondary motion means including a first portion thereof connected to said second set of plates, said secondary motion means having a second portion thereof connected to said movable platen and to said first set of plates via said support member whereby motion of the movable platen is operable to drive said primary motion means which, in turn, is operable to drive said first secondary motion means effective to open and close two mold stations simultaneously.

4. The improvement of claim 3 wherein:

said first secondary motion means includes a third pinion connected to said second set of plates, a first rack connected to said first set of plates, and, a second rack connected to said movable platen, both said first and second racks in operable engagement with said third pinion whereby at least two mold stations are activated.

5. The improvement of claim 4 wherein a second secondary motion means includes a fourth pinion carried by a third set of plates, and cooperating third and fourth racks connected to the fixed platen and to the first set of plates respectively and in operable engagement with said fourth pinion whereby motion of said first set of plates in the opening direction operates to activate two additional mold stations so that motion of movable platen controls the opening and closing of four mold stations.

6. The improvement in claim 5 wherein the third and fourth pinions are identical in configuration and the mechanical advantage created by the first and second pinions in conjunction with the identical third and fourth pinions is such that motion of the movable platen through a linear distance x in the opening direction causes the first set of plates to move a linear distance x/2 and the second set of plates to move a linear distance 3x/4, and the third set of plates to move a linear distance x/4 whereby all mold stations open simultaneously and to precisely the same extent.

* * * * *

UNITED STATES PATENT AND TRADEMARK OFFICE
CERTIFICATE OF CORRECTION

PATENT NO. : 5,578,333
DATED : November 26, 1996
INVENTOR(S) : ROBERT D. SCHAD, ET AL.

It is certified that error appears in the above-indentified patent and that said Letters Patent is hereby corrected as shown below:

COLUMN 3

Line 56, "24," should read --w,4,--.

COLUMN 4

Line 58, "support pivotally" should read --pivotally support--.

COLUMN 6

Line 53, "means," should read --means, and--.
Line 61, "including" should read --includes--.
Line 63, "plates," should read --plates, and--.
Line 65, "having" should read --includes--.

COLUMN 8

Line 4, "of" should read --of the--.
Line 6, "in" should read --of--.

Signed and Sealed this

Fifteenth Day of July, 1997

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO.   : 5,578,333
DATED        : November 26, 1996
INVENTOR(S)  : John DiSimone, et al.

It is certified that error appears in the above-identified patent and that said Letters Patent is hereby corrected as shown below:

The title page item [19] "Shad et al." Should read -- DiSimone et al. -- and Item [75] Inventors: should read -- John DiSimone, Woodbridge; Robert D. Schad, Toronto, both of Canada --.

Signed and Sealed this

Thirty-first Day of March, 1998

Attest:

BRUCE LEHMAN

*Attesting Officer*    *Commissioner of Patents and Trademarks*